G. A. PINGREE.
BEET HARVESTER.
APPLICATION FILED MAR. 9, 1909.
940,189.
Patented Nov. 16, 1909.
2 SHEETS—SHEET 1.
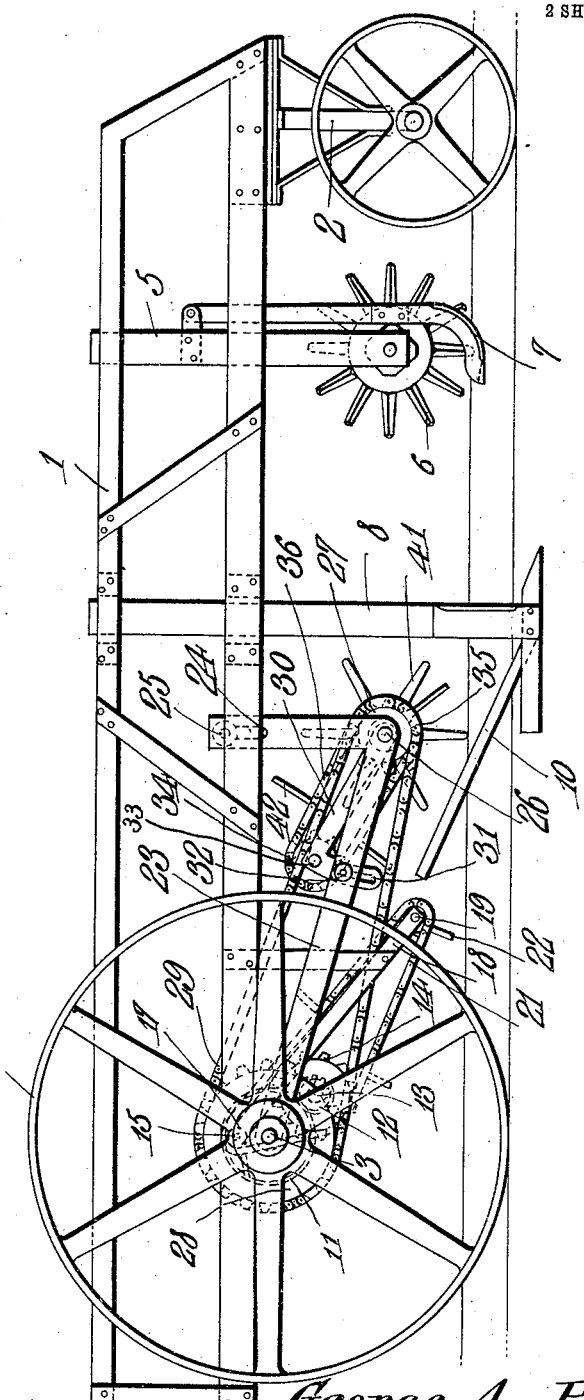
Witnesses
E. W. Stewart
E. Daniels
Inventor
George A. Pingree
By C. A. Snow & Co.
Attorneys

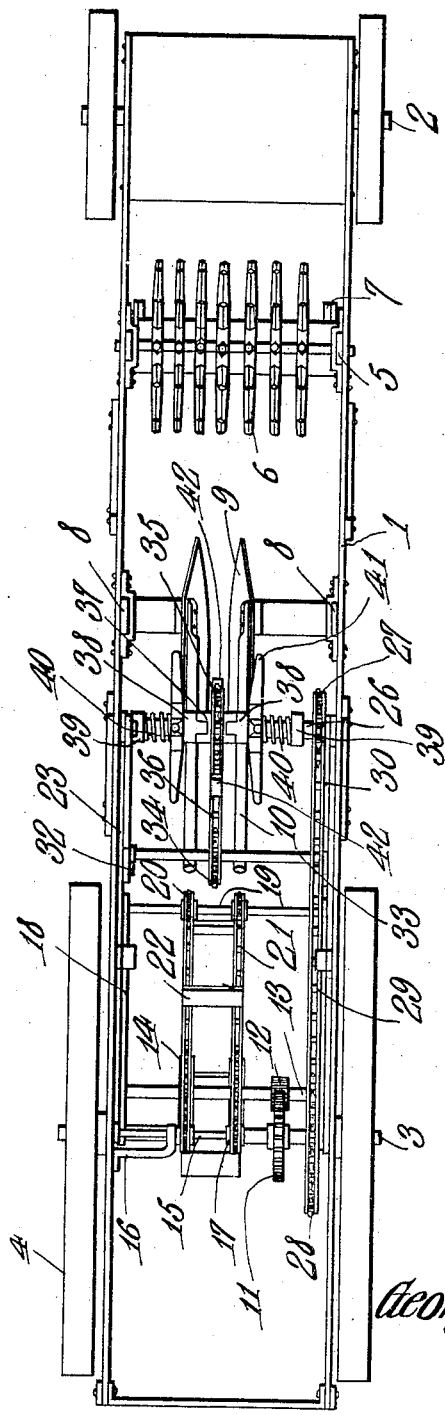

UNITED STATES PATENT OFFICE.

GEORGE A. PINGREE, OF ROCKY FORD, COLORADO.

BEET-HARVESTER.

940,189.  Specification of Letters Patent. Patented Nov. 16, 1909.

Application filed March 9, 1909. Serial No. 482,343.

*To all whom it may concern:*

Be it known that I, GEORGE A. PINGREE, a citizen of the United States, residing at Rocky Ford, in the county of Otero and State of Colorado, have invented a new and useful Beet-Harvester, of which the following is a specification.

This invention has relation to beet harvesters and it consists in the novel construction and arrangement of its parts, as hereinafter shown and described.

The object of the invention is to provide, in a beet harvester, means for transferring the beets from lifters attached to the diggers commonly used in such structures, and depositing the same upon an elevator arranged at the rear portion of the machine. In other words, the principal feature of the present invention is a transmitter of peculiar arrangement and operation adapted to pass the beets from the digger to the elevator.

In the accompanying drawings:—Figure 1 is a side elevation of the best harvester. Fig. 2 is a top plan view of the same.

The harvester consists of a frame 1, which is mounted at its forward end portion upon a wheel-supported truck 2, and at its rear end portion upon an axle 3, which, in turn, is mounted upon traction wheels 4. A frame 5 is carried at the forward portion of the frame 1, and a finder 6 is journaled for rotation at the lower portion of the said frame. The said finder is preferably in the form of a drum having a series of radiating fingers, but as the said finder forms no part of the present invention, further description thereof is deemed unnecessary. A knife 7 is also attached to the frame 5 and is adapted to operate upon the tops of the beets under the finder 6. Standards 8 are attached to the frame 1 at points intermediate of the ends thereof and carry at their lower ends shares or diggers 9. Inclined rods 10 are attached at their lower forward ends to the said shares 9 or the lower end portions of the standards 8, and the rod 10 mounted upon one share 9 is spaced from the rod 10 mounted upon the other share, as illustrated. A gear wheel 11 is fixed to the axle 3 and meshes with a gear wheel 12, mounted upon a shaft 13; the said shaft 13 is journaled for rotation upon the frame 1 and is located below and slightly in advance of the axle 3. Sprocket wheels 14 are fixed to the shaft 13 and are spaced from each other. A shaft 15 is journaled for rotation in brackets 16 attached to the frame 1, and idlers 17 are journaled upon the shaft 15. Downwardly inclined arms 18 are supported by the frame 1, and a shaft 19 is journaled at the lower ends of the arms 18. Sprocket idlers 20 are journaled upon the shaft 19, and sprocket chains 21 pass around the sprocket wheels 14 and sprocket idlers 17 and 20. The chains 21 carry the cross slats or bars 22. Thus it will be seen that as the machine is drawn along the ground and the traction wheels 4 rotate in the direction of movemnt of the machine, through the axle 3 and intermeshing gear wheels 11 and 12, rotary movement is transmitted to the shaft 13 in the opposite direction. As the chains 21 derive their movement from the wheels 14 carried by the shaft 13, the said chains 21 move orbitally, and their upper runs move from the forward end toward the rear end of the frame 1. The said chains and cross bars or slats 22 form an elevator for raising and delivering the beets as they are deposited upon the same, as will be hereinafter explained.

L-shaped arms 23 are pivotally mounted at their rear ends upon the axle 3, and are provided at their forward extremities with elongated slots 24, which receive pins 25, mounted upon the frame 1. A shaft 26 is journaled for rotation at the lower forward portions of the arms 23, and carries a sprocket wheel 27. A sprocket wheel 28 is fixed to the axle 3, and a sprocket chain 29 passes around the sprocket wheels 27 and 28.

L-shaped arms 30 are pivotally mounted at their forward ends upon the shaft 26, and are provided at their rear ends with elongated slots 31, which receive pins 32, carried by the intermediate portion of the lower part of the arms 23. A shaft 33 is journaled for rotation at the upper rear portions of the arms 30. A sprocket wheel 34 is fixed to the shaft 33 approximately at a point midway between its ends. A sprocket wheel 35 is fixed to the shaft 26 at a point approximately midway between its ends and a sprocket chain 36 passes around the sprocket wheels 34 and 35. The hub of the sprocket wheel 35 is provided at each side of the said wheel with a clutch member 37. The wheel 35 is fixed with relation to the shaft 26. Clutch members 38 are loosely mounted upon the shaft 26 and are adapted to engage the clutch extremities 37 of the hub of the wheel 35. Collars 39 are adjustably mounted upon the shaft 26 and coil springs 40 are interposed between the said collars and the clutch hub 38. The said springs 40 are under tension with a tendency to hold the clutch members 38 in engagement with the clutch extremities 37 of the wheel 35. The clutch members 38 carry radially disposed fingers 41 and the chain belt 36 carries outstanding fingers 42.

From the above description it is obvious that as the machine is drawn along a row of beets and the shares 9 are passed at opposite sides of the said row, the said shares will engage the beets after the tops have been removed by the knife-blade 7, and pass the same back along the rods 10. By reason of the fact that the said rods 10 are upwardly inclined toward their rear ends they will lift the beets in the soil, and, as the beets pass toward the upper ends of the said rods they are engaged by the fingers 41 carried by the clutch members 38. Inasmuch as the said clutch members are held toward each other under the tension of the springs 40 they may also move away from each other against the tension of the said springs, and thus the fingers 41 of one of the members may move away from the fingers 41 of the other member and vice versa, so that the space between the two sets of fingers may be increased to receive extra large beets. Also should the fingers 41 encounter a large obstruction, as for instance, a loose stone, the stone will separate the two sets of fingers 41 to such an extent as to cause their respective clutch members 38 to disengage the clutch extremities 37 of the sprocket wheel 35, and thus the sets of fingers 41 will cease to rotate about the axis of the shaft 26, and will remain at a state of rest until the said obstruction is removed.

It is of course understood that the shaft 26 derives its movement from the axle 3 through the sprocket wheels 27 and 28 and the connecting chain 29, and, by reason of the fact that the sprocket wheel 27 is of less diameter than the sprocket wheel 28, the fingers 41 will rotate at a greater rate of speed than that in which the machine, as an entirety, moves in a forward direction, and, as the fingers engage the beets, while they are still in contact with the soil, the resistance on the part of the soil causes the said fingers to firmly grip the beets and carry the same up along the upper portions of the rods 10. When the beets have been entirely raised above the surface of the ground they are engaged by the fingers 42 carried by the chain 36 and forced from between the two sets of fingers 41 and deposited upon the upper runs of the chain belts 21, and are carried up along the same by the cross slats or bars 22. The fingers 42 are enabled to remove the beets from between the two sets of fingers 41 by reason of the fact that the chain belt 36 which carries the fingers 42 moves in an elongated orbit, while the fingers 41 move in a circular orbit about the axis of the shaft 26.

It will also be seen that by reason of the fact that the arms 23 may move vertically at their forward portions, the fingers 41 may accommodate themselves vertically with relation to beets of different sizes, and also by reason of the fact that the arms 30 may move vertically at their rear ends, such vertical accommodation is possible upon the part of the fingers 42.

Having described my invention, what I claim as new, and desire to secure, by Letters Patent, is:—

1. In a beet harvester having a digger and an elevator means for transmitting the beets from the digger to the elevator comprising a plurality of sets of fingers arranged for movement about an axis and resiliently held toward each other and moving over the digger toward the elevator.

2. In a beet harvester comprising a digger and an elevator, means for transmitting the beets from the digger to the elevator comprising a plurality of sets of fingers arranged to rotate about an axis and located over the digger and movable toward the elevator, and a series of fingers arranged for orbital movement in a plane between the first said sets of fingers.

3. In a beet harvester comprising a digger and an elevator means for transmitting the beets from the digger to the elevator comprising a plurality of sets of fingers mounted for rotation about an axis and located over the digger and movable toward the elevator, means for resiliently holding the said sets of fingers toward each other, and another set of fingers arranged for orbital movement between the first sets of fingers.

4. In a beet harvester comprising a digger and an elevator, means for transmitting the beets from the digger to the elevator, arms pivotally mounted at their rear ends and free for limited vertical movement at their forward ends, a shaft journaled for rotation at the forward portions of the arms, fingers mounted upon the shaft for rotation about the axis thereof, and a second set of fingers arranged for orbital movement about the axis of the supporting shaft of the first said set of fingers.

5. In a beet harvester comprising a digger and an elevator, means for transmitting the beets from the digger to the elevator comprising arms pivotally supported at their rear ends and free for vertical movement at their forward portions, a shaft journaled for rotation at their forward portions, two sets of fingers mounted upon the shaft, resilient means for holding the said sets of fingers toward each other, arms pivoted at their forward ends upon said shaft and free for vertical movement at their rear ends, a shaft journaled at the rear ends of the last said arms, and fingers arranged for orbital movement about both of the said shafts and in a plane between the sets of fingers upon the first said shafts.

In testimony that I claim the foregoing as my own, I have hereto affixed my signature in the presence of two witnesses.

GEORGE A. PINGREE.

Witnesses:
PAUL M. NORTH,
Z. T. ROBERTS.